United States Patent [19]

Kearney et al.

[11] Patent Number: 5,572,551

[45] Date of Patent: Nov. 5, 1996

[54] CARRIER LOOP ACQUISITION FOR STAGGERED PHASE SHIFT KEYING

[75] Inventors: Brian P. Kearney, Tempe; Kurt A. Kallman, Mesa, both of Ariz.

[73] Assignee: Motorola, Inc., Schaumburg, Ill.

[21] Appl. No.: 522,887

[22] Filed: Sep. 1, 1995

[51] Int. Cl.$^6$ ............................................. H04L 27/14
[52] U.S. Cl. ............................................. 375/326
[58] Field of Search ............................ 375/326, 279, 375/282, 329, 333, 371, 373, 375; 329/304; 370/108

[56] References Cited

U.S. PATENT DOCUMENTS

| | | | |
|---|---|---|---|
| 4,644,561 | 2/1987 | Paneth et al. | 375/9 |
| 4,816,775 | 3/1989 | Ryan | 331/12 |
| 4,847,876 | 7/1989 | Baumbach et al. | 375/113 |
| 4,871,975 | 10/1989 | Nawata et al. | 375/326 |
| 5,255,292 | 10/1993 | LaRosa et al. | 375/116 |

OTHER PUBLICATIONS

An article entitled "A Differential Offset–QPSK Modulation/Demodulation Technique for Point–to–Multipoint Radio Systems". by Tho Le–Ngoc, Concordia University, Department of Electrical and Computer Engineering and SR Telecom Inc., Laurent, P.Q., Canada, ©1987, IEEE.

An article entitled "A TDMA Satellite Communication System for ISDN Services–QPSK Burst Modem Coupled with High Coding Gain FEC–" by S. Kato et al., NTT Radio Communication Systems Laboratories, Yokosuka, Japan, ©1991, IEEE. pp. 1533–1541.

Primary Examiner—Stephen Chin
Assistant Examiner—Kevin Kim
Attorney, Agent, or Firm—Frank J. Bogacz

[57] ABSTRACT

An arrangement for acquiring an input signal has a complex multiplier (30) which receives two staggered channels (42I and 42Q). The first channel is delayed (31). A phase error estimator (22) then estimates the error in each of the channels. Another delay (23) re-introduces the delay between the two channels. Another complex multiplier (24) produces the output (34I and 34Q) which is fed-back to complex multiplier (30).

16 Claims, 4 Drawing Sheets

FIG. 3
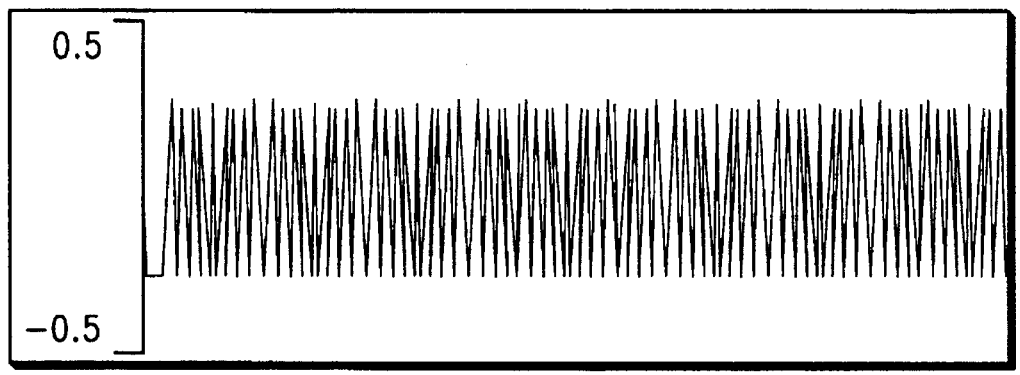
FIG. 4
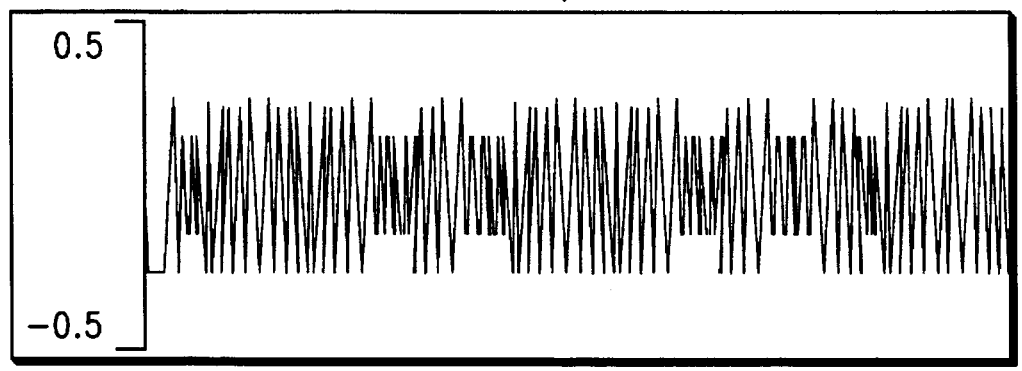
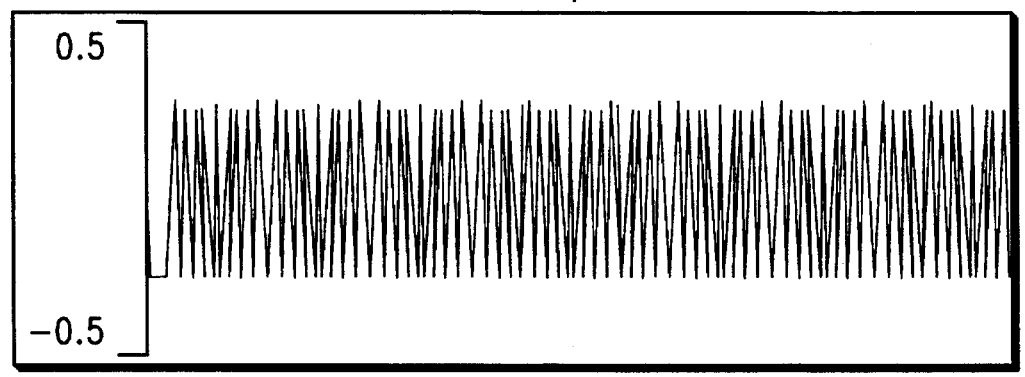
FIG. 5

5,572,551

CARRIER LOOP ACQUISITION FOR STAGGERED PHASE SHIFT KEYING

GOVERNMENT LICENSE RIGHTS

The U.S. Government has rights as provided for by the terms of contract No. N00600-92-C-3377 awarded by the U.S. Navy.

BACKGROUND OF THE INVENTION

This invention generally relates to carrier acquisition of a digitally modulated signal. Specifically, the present invention relates to the carrier acquisition of a Time Division Multiple Access (TDMA) digitally modulated signal. More specifically, the present invention relates the carrier acquisition of a TDMA digitally modulated signal employing staggered formats.

Conventional TDMA carrier acquisition circuits employ the same data detector for both the preamble field and the data field. This allows the carrier phase to lock in an ambiguous phase state. The carrier phase state is then resolved by the detection of the unique word (UW). The resolution of the carrier phase ambiguity requires multiple UW detectors.

An approach for improved carrier acquisition is shown in U.S. Pat. No. 4816775 entitled "Negative feedback, phase rotation, phase acquisition and tracking apparatus and method". This invention describes data detection circuits and modifications to the previously patented approach that result in improved UW detection performance and reduced hardware complexity. In particular this invention applies to staggered modulation formats for use through non-linear channels.

BRIEF DESCRIPTION OF THE DRAWING

FIG. 3 is a waveform diagram for BPSK for a normal carrier loop in accordance with the present invention.

FIG. 4 is a waveform diagram for SBPSK for a normal carrier loop in accordance with the present invention.

FIG. 5 is a waveform diagram for SBPSK for a revised carrier loop in accordance with the present invention.

DESCRIPTION OF THE PREFERRED EMBODIMENT

Figure 1:
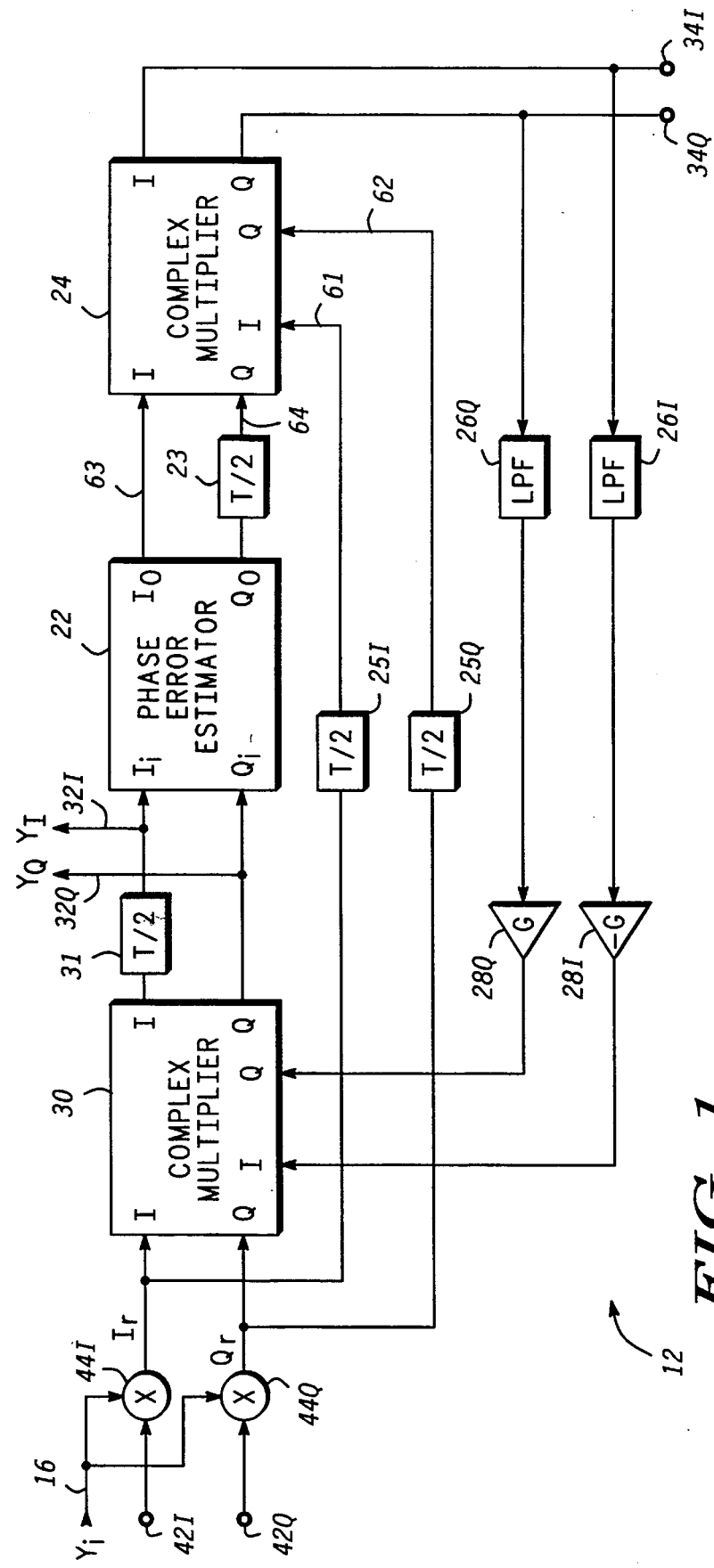
FIG. 1 is a schematic diagram of a carrier loop circuit in accordance with the present invention.

FIG. 1 shows the embodiment of the invention which is used in carrier acquisition applications for staggered modulation formats (formats where the data in the I and Q channels are staggered by one-half of a symbol period). This arrangement acquires an input signal. For the purpose of this discussion of the shown embodiment, it is assumed that the received modulated signal has been generated by delaying the Q channel relative to the I by one-half of a symbol period. If the recieved modulated signal was generated by the I channel relative to the Q channelby one-half of a symbol period, the location of the delays would change, but the overall operation of the invention would be the same as described herein.

In the FIG. 1 embodiment, the input carrier signal is applied at terminal 16. Terminal 16 couples to first inputs of multipliers 44I and 44Q. Second inputs of multipliers 44I and 44Q are coupled from terminals 42I and 42Q, respectively. Multiplier 44I and 44Q together represent a complex phase detector.

The output of multiplier 44I couples to a first in-phase input of complex multiplier 30 and to a T/2(one-half symbol period) delay 25I. The output from multiplier 44Q couples to the first quadrature input of complex multiplier 30 and to a T/2 delay 25Q. The output of delays 25I and 25Q are coupled to the first in-phase and quadrature-phase inputs 61 and 62 of complex multiplier 24, respectively. The purpose of delays 25I and 25Q is to time-align the signals appearing at the first inputs 61 and 62 of complex multiplier 24 with the second inputs 63 and 64 of complex multiplier 24.

The in-phase output (I) of complex multiplier 30 couples to the input of T/2delay 31. The output of T/2delay 31 couples to the in-phase input ($I_r$) of phase error estimator 22 and to terminal 32I. The quadrature output (Q) of complex multiplier 30 couples to a quadrature input ($Q_r$) of phase error estimator 22 and to terminal 32Q. Together, terminals 32I and 32Q provide the output signal from this embodiment of the present invention which could be used, for instance, as inputs to a symbol tracking loop. Delay 31 serves to de-stagger the I and Q channels so that they transition coincidentally, that is to say the signals appearing at the inputs of phase error estimator 22 appear as a non-staggered modulation format would.

An in-phase output ($I_o$) of phase error estimator 22 couples to the second in-phase input 63 of complex multiplier 24, and a quadrature output ($Q_O$) of phase error estimator 22 couples to the input T/2delay 23. The output of delay 23 couples to the second quadrature input 64 of complex multiplier 24. The purpose of delay 23 is to re-stagger the outputs of the phase error estimator 22 so that the signals presented to the second inputs 63 and 64 of complex multiplier 24 have the same relative time alignment as the signals input to the first inputs ($I_r$ and $Q_r$) of complex multiplier 30 and subsequently the signals input to the first inputs 61 and 62 of complex multiplier 24.

The in-phase output (I) of complex multiplier 24 couples to terminal 34I and to the input of low pass filter 26I. Likewise, the quadrature output (Q) of complex multiplier 24 couples to terminal 34Q and to the input of low pass filter 26Q. The output of low pass filter 26I couples to the input of amplifier 28I, and the output of low pass filter 26Q couples to the input of amplifier 28Q. It should be noted that amplifier 28I has negative gain while amplifier 28Q has positive gain. This is equivalent to taking the complex conjugate of the signal being applied to the first input of complex multiplier 24. The output of amplifier 28I couples to the second in-phase input of complex multiplier 30, and the output of amplifier 28Q couples to the second quadrature input of complex multiplier 30. In this embodiment of the present invention, complex multiplier 30 performs the phase rotation function, and complex multiplier 24 performs the phase error combination function.

In this embodiment of the present invention, an in-phase component of a reference signal is applied at terminal 42I and a quadrature component of the reference signal is applied at 42Q. The reference signal applied at terminals 42 I and Q could be generated using a voltage controlled oscillator such as that shown in outer feed-back path 14 of FIG. 1 in U.S. Pat. No. 4,816,775. This reference signal mixes with the input carrier signal in multipliers 44 I and Q to produce a baseband signal $I_r$ at the output of multiplier 44I and $Q_r$ at the output of multiplier 44Q. $I_r$ and $Q_r$ represent demodulated I and Q phase signals which reflect the arbitrary phase difference between the instantaneous reference signal and the instantaneous carrier signal.

The $I_r$ and $Q_r$ signals are baseband signals which are rotated by complex multiplier 30 in response to a feed-back signal is generated by amplifiers 28. This feedback signal is generated by feedback loop 12 so that the resulting rotated, demodulated I and Q signals produced at the output of complex multiplier 30 are independent of the arbitrary phase difference between the carrier signal and the reference signal.

The net result of delays 23, 25I, 25Q, and 31 is that it allows one to use phase error estimators identical to those used for similar non-staggered modulation formats. Phase error estimator 22 may be represented by any one of several different estimation configurations. Improved acquisition performance may be obtained by matching the design of phase error estimator 22 to the anticipated type of modulation exhibited by the carrier signal input at terminal 16.

Figure 6:
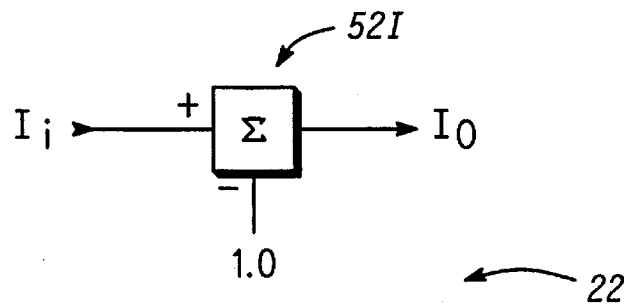
FIG. 6 is a schematic diagram of an embodiment phase error estimator in accordance with the present invention for substantially pure carrier.
Figure 7:
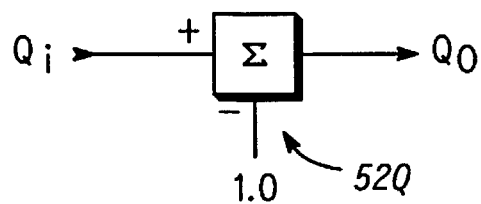
FIG. 7 is a schematic diagram of another embodiment phase error estimator in accordance with the present invention for BPSK.
Figure 7:
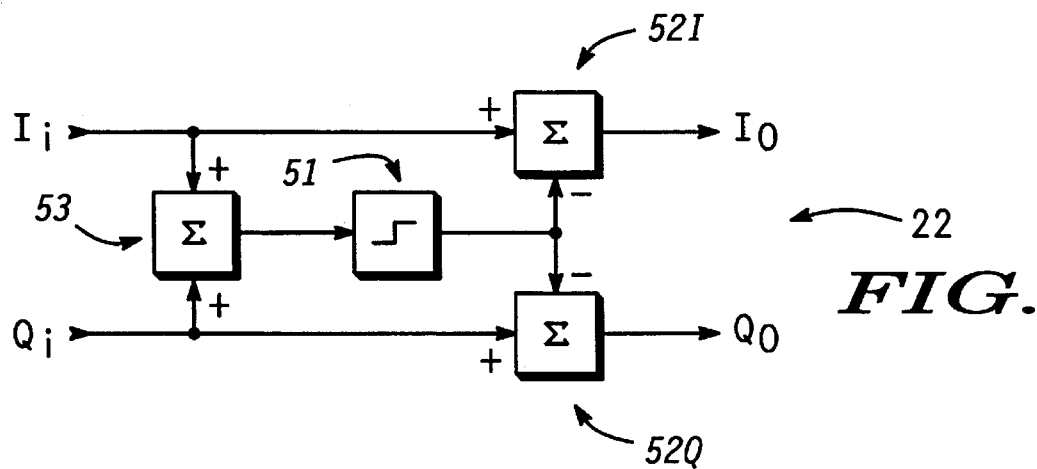
Figure 8:
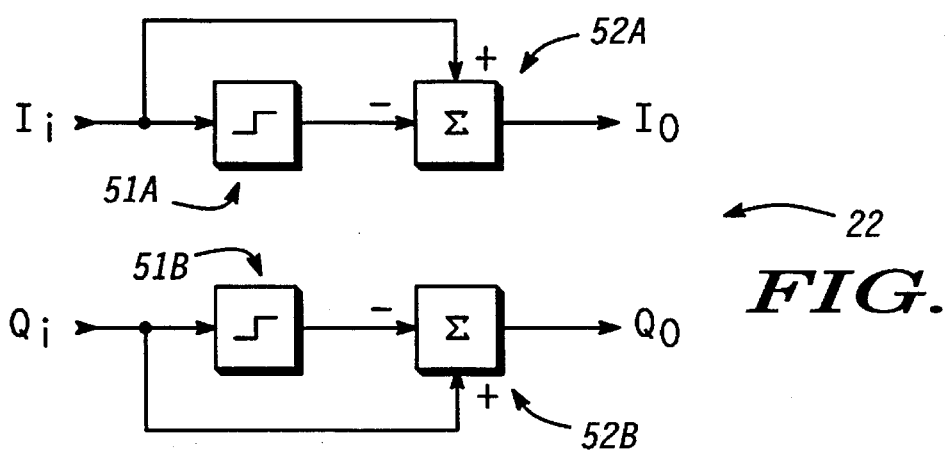
FIG. 8 is a schematic diagram of yet another embodiment phase error estimator in accordance with the present invention FOR QPSK.

FIGS. 6–8 show different embodiments of phase error estimator 22. The embodiment of phase error estimator 22 shown in FIG. 6 represents a phase error estimator that may advantageously be used when loop 12 acquires a substantially pure carrier input signal (i.e. no modulation). In FIG. 6, in-phase input $I_i$ couples to a positive (+) input of summing device 52I and a constant DC bias value of 1.0 unit couples to the negative (−) input of summing device 52I. The output summing device 52I couples to in-phase output $I_o$. Additionally, quadrature input $Q_i$ couples to a + input of summing device 52Q and a constant DC bias value of 1.0 unit couples to the − input of summing device 52Q. The output summing device 52Q couples to in-phase output $Q_o$. The result of using the phase error estimator embodiment shown in FIG. 6 is that the phase of the vector represented by $I_r$ and $Q_r$ is forced to 45° in the complex plane.

Figure 2:
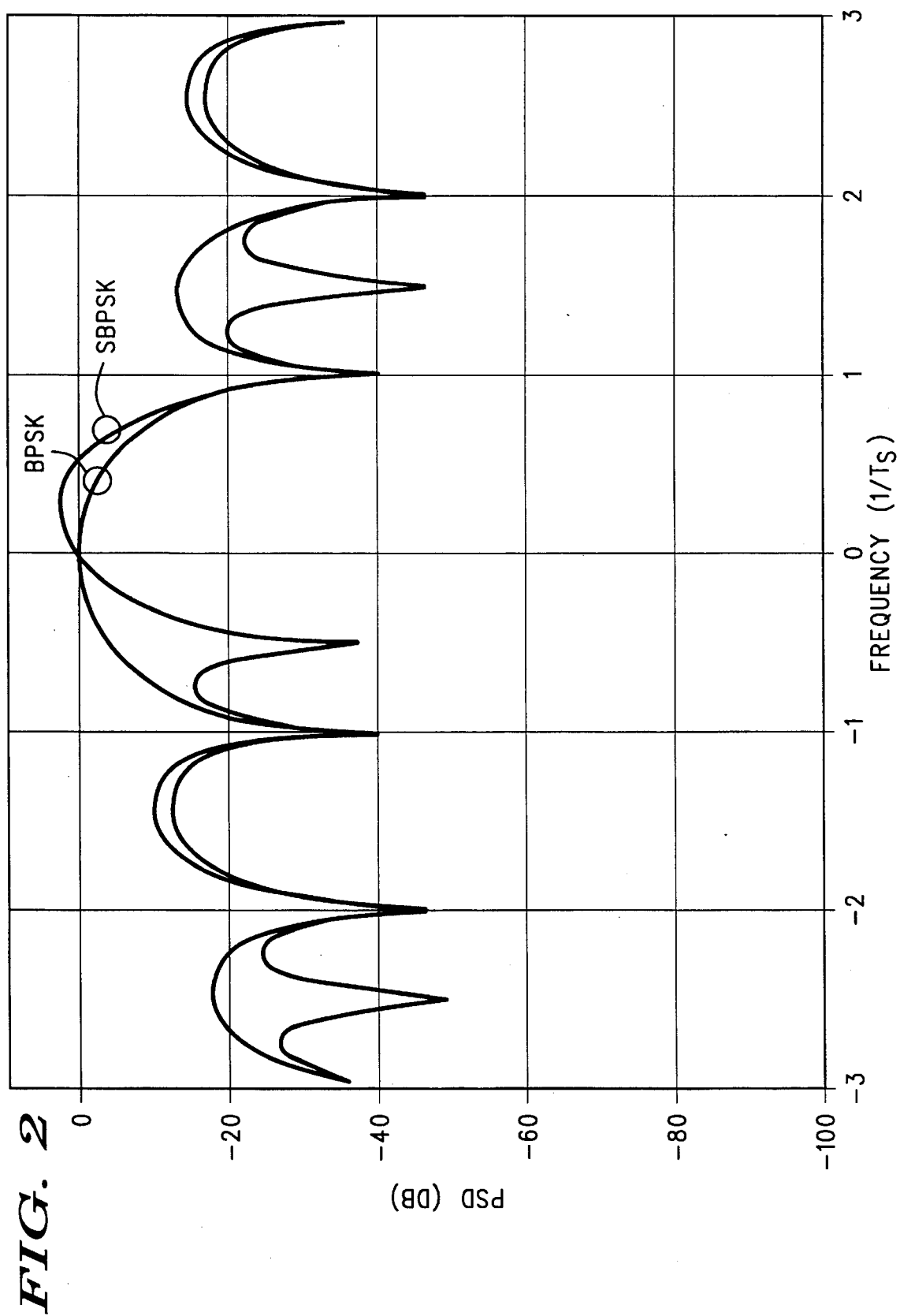
FIG. 2 is a diagram of a power spectral density plot of staggered binary phase shift keying (SBPSK) compared with conventional binary phase shift keying (BPSK) in accordance with the present invention.

The embodiment of phase error estimator 22 shown in FIG. 7 is particularly useful when loop 12 acquires a Staggered Binary Phase-Shift Keying (SBPSK) modulated carrier signal. SBPSK modulation is essentially Staggered Quadrature Phase-Shift Keying (SQPSK) modulation where the in-phase and quadrature-phase signals are the same. FIG. 2 shows a comparison of the Power Spectral Density (PSD) of SBPSK and BPSK. Due to the staggered data in SBPSK, a change in the symbol always results in a positive phase increase. The result is that the SBPSK PSD is greater at frequencies above the carrier. In SBPSK carrier modulation, the smallest increment of phase modulation during a symbol period is 180° which is realized by two 90° phase increments occurring in one-half symbol period intervals. Using the embodiment of the invention shown in FIG. 1, the signal applied at the input of phase error estimator 22 appears as if it were a BPSK signal. Accordingly, in-phase input $I_i$ couples to the first input of summing device 53 and to the + input of summing device 52I. Quadrature-phase input Qi couples to the second input of summing device 53 and to the + input of summing device 52Q. The output of summing device 53 is coupled to the input of limiter 51. The output of limiter 51 couples to the − input of summing device 52I and to the − input of summing device 52Q. The output summing device 52I couples to in-phase output $I_o$ and the output of summing device 52Q couples to the quadrature-phase output $Q_o$. The result of using the phase error estimator embodiment shown in FIG. 7 is that the phase of the vector represented by Ir and Qr is forced to either 45° or −135° (180° phase difference) in the complex plane.

FIG. 3 shows the baseband waveform for BPSK at the point where a data decision is made (the input to limiter 51 in FIG. 7) when the phase error estimator in FIG. 7 is used with the carrier acquisition circuit as described in the reference patent mentioned above. FIG. 4 shows the result of the same circuit but with a SBPSK input. It can be seen that the resulting waveform is different than that shown in FIG. 3. This difference is caused by the fact that the prior art carrier acquisition circuit does not provide for the optimum detection of the received SBPSK signal. The result is approximately a 3 dB loss in the Bit Error Rate (BER) performance. FIG. 5 shows the same signal using the modified carrier acquisition circuit as presented in this patent. It can be seen that the resulting waveform is identical to the BPSK results shown in FIG. 3 and will result in the identical optimum BER performance.

FIG. 8 shows a phase error estimator 22 which is suitable for use in SQPSK, and Minimum-Shift Keying (MSK) types of carrier modulation. In this embodiment of phase error estimator 22, the input $I_i$ couples to an input of a limiter 51A and to a + input of a summing device 52A. An output of limiter 51A couples to the − input of summing device 52A, and an output of summing device 52A couples to in-phase output $I_o$. Likewise, quadrature input $Q_i$ couples to an input of a limiter 51B and to the + input of a summing device 52B. An output of limiter 51B couples to the − input of summing device 52B, and an output of summing device 52B couples to quadrature output $Q_o$. The result of using the phase error estimator embodiment shown in FIG. 8 is that the phase of the vector represented by Ir and Qr is forced to either 45°, −45°, 135° or −135° (90° phase increments) in the complex plane.

Referring back to FIG. 1, complex multiplier 24 multiplies the complex conjugate (recall that this is accomplished by making the gain of amplifier 28I negative) of the original demodulated $I_r$ and $Q_r$ signals by the estimated phase error signal produced by phase error estimator 22. The output of complex multiplier 24 is filtered and amplified and utilized as a feedback signal which controls the phase rotation produced by complex multiplier 30. It can be shown that the output signals $Y_I$ and $Y_o$ at terminals 32I and 32Q in FIG. 1 can be acquired independently of a particular arbitrary phase angle exhibited by the reference signal applied at terminals 42.

In summary, this invention allows the use of phase error estimators optimized for non-staggered formats to be used with received staggered format signals. Additionally, the circuits shown in FIGS. 6–8 force the phase of the vector represented by Ir and Qr to either 45°, −45°, 135°, or −135° for pure carrier, SBPSK, or SQPSK. Thus, if it is necessary to switch between the above phase error estimators, as is normally done during the preamble portion of a received Time-Division Multiple-Access (TDMA) signal, no phase discontinuity occurs in the signal which is applied to the second input of complex multiplier 30.

The present invention is described above with reference to particular embodiments which facilitate teaching this invention. Those skilled in the art will recognize that many alternative embodiments also fall within the scope of the present invention. For example, the above description referred to various polarities within complex multipliers, amplifiers, and summing circuits. Those skilled in the art will recognize that alternative devices and connections between devices may be used to reverse polarities associated with virtually all devices discussed above. Likewise, the use of summing devices will be understood by those skilled in the art to include both addition and subtraction devices. Furthermore, those skilled in the art of feedback loops will understand that particular gains and constant values discussed above do not represent critical parameters in the present invention, but may withstand a wide variation. These and other changes and modifications to the above-described preferred embodiments which are obvious to those skilled in the art are intended to be included within the scope of the present invention.

What is claimed is:

1. An arrangement for acquiring an input signal, the arrangement comprising:

a first complex multiplier for receiving said input signal having first and second channels, said second channel being delayed with respect to said first channel by one-half of a symbol period, said first complex multiplier providing first and second multiplier output signals, said first complex multiplier having feed-back inputs and for rotating said first and second multiplier output signals;

a first delay coupled to said first complex multiplier for delaying said first multiplier output signal by a one-half of a symbol period;

a phase error estimator coupled to said first delay and to said first complex multiplier, said phase error estimator estimating an error related to said first multiplier output signal and said second multiplier output signal for producing first and second phase error estimator output signals;

said phase error estimator including:
a first summer coupled to said first channel for accumulation an error of said first channel;
a second summer coupled to said second channel for accumulation an error of said second channel;
a third summer coupled to said first and second channels for accumulation of said first and second phase error estimator output signals;

a second delay coupled to said phase error estimator and for delaying said second phase error estimator output signal by said one-half of a symbol period; and a second complex multiplier coupled to said second delay and to said phase error estimator, said second complex multiplier rotating said second phase error estimator output signal and said first phase error estimator output signal to produce third and fourth multiplier output signals, said second complex multiplier coupled to said feed-back inputs of said first complex multiplier for transmitting said third and fourth multiplier output signals to said first complex multiplier.

2. An arrangement for acquiring an input signal as claimed in claim 1, wherein there is further included:

a first multiplier coupled to said first complex multiplier, said first multiplier for demodulating said input signal with a first quadrature reference signal to produce a first baseband signal; and a second multiplier coupled to said first complex multiplier, said second multiplier for demodulating said input signal with a second quadrature reference signal to produce a second baseband signal.

3. An arrangement for acquiring an input signal as claimed in claim 1, wherein there is further included:

a third delay coupled between said first channel and said second complex multiplier, said third delay for delaying said first baseband signal; and a fourth delay coupled between said second channel and said second complex multiplier, said fourth delay for delaying said second baseband signal.

4. An arrangement for acquiring an input signal as claimed in claim 1 wherein there is further included:

a first low-pass filter coupled to said second complex multiplier, said first low-pass filter for filtering said third multiplier output signal; and a second low-pass filter coupled to said second complex multiplier, said second low-pass filter for filtering said fourth multiplier output signal.

5. An arrangement for acquiring an input signal as claimed in claim 4, wherein there is further included:

a first amplifier coupled between a first feed-back input of said first complex multiplier and said first low-pass filter, said first amplifier having a negative gain; and a second amplifier coupled between a second feed-back input of said first complex multiplier and said second low-pass filter, said first amplifier having a positive gain.

6. An arrangement for acquiring an input signal as claimed in claim 1 wherein said phase error estimator includes:

a first summer coupled to said first channel for accumulation an error of said first channel; and a second summer coupled to said second channel for accumulation an error of said second channel.

7. An arrangement for acquiring an input signal as claimed in claim 1 wherein said phase error estimator further includes a limiter coupled to said first, second and third summers, said limiter for limiting said first and second phase error estimator output signals.

8. An arrangement for acquiring an input signal as claimed in claim 1 wherein said phase error estimator includes:

a first summer coupled to said first channel for accumulation an error of said first channel;

a second summer coupled to said second channel for accumulation an error of said second channel;

a first limiter coupled to said first channel and to said first summer, said first limiter for limiting said first phase error estimator output signal of said first channel; and a second limiter coupled to said second channel and to said second summer, said second limiter for limiting said second phase error estimator output signal of said second channel.

9. An arrangement for acquiring an input signal, the arrangement comprising:

a first complex multiplier for receiving said input signal having first and second channels, said second channel being delayed with respect to said first channel by one-half of a symbol period, said first complex multiplier providing first and second multiplier output signals, said first complex multiplier having feed-back inputs and providing rotated first and second multiplier output signals;

a first delay coupled to said first complex multiplier for delaying said first multiplier output signal by a one-half of a symbol period;

a phase error estimator coupled to said first delay and to said first complex multiplier, said phase error estimator estimating an error related to said first multiplier output signal and said second multiplier output signal for producing first and second phase error estimator output signals;

said phase error estimator including:
- a first summer coupled to said first channel for accumulation an error of said first channel;
- a second summer coupled to said second channel for accumulation an error of said second channel;
- a third summer coupled to said first and second channels for accumulation of said first and second phase error estimator output signals;

a second delay coupled to said phase error estimator and for delaying said second phase error estimator output signal by said one-half of a symbol period;

a second complex multiplier coupled to said second delay and to said phase error estimator, said second complex multiplier rotating said second phase error estimator output signal and said first phase error estimator output signal to produce third and fourth multiplier signals, said second complex multiplier coupled to said feed-back inputs of said first complex multiplier for transmitting said third and fourth multiplier output signals to said first complex multiplier; and a third delay coupled between said first and second channels and said second complex multiplier, said third delay for delaying said first and second channels for input to said second complex multiplier.

10. An arrangement for acquiring an input signal as claimed in claim 9, wherein there is further included:
- a first multiplier coupled to said first complex multiplier, said first multiplier for demodulating said input signal with a first quadrature reference signal to produce a first baseband signal; and
- a second multiplier coupled to said first complex multiplier, said second multiplier for demodulating said input signal with a second quadrature reference signal to produce a second baseband signal.

11. An arrangement for acquiring an input signal as claimed in claim 9, wherein said third delay includes:
- a fourth delay coupled between said first channel and said second complex multiplier, said third delay for delaying said first baseband signal; and
- a fifth delay coupled between said second channel and said second complex multiplier, said fourth delay for delaying said second baseband signal.

12. An arrangement for acquiring an input signal as claimed in claim 9, wherein there is further included:
- a first low-pass filter coupled to said second complex multiplier, said first low-pass filter for filtering said third multiplier output signal; and
- a second low-pass filter coupled to said second complex multiplier, said second low-pass filter for filtering said fourth multiplier output signal.

13. An arrangement for acquiring an input signal as claimed in claim 12, wherein there is further included:
- a first amplifier coupled between a first feed-back input of said first complex multiplier and said first low-pass filter, said first amplifier having a negative gain; and
- a second amplifier coupled between a second feed-back input of said first complex multiplier and said second low-pass filter, said first amplifier having a positive gain.

14. An arrangement for acquiring an input signal as claimed in claim 9, wherein said phase error estimator includes:
- a first summer coupled to said first channel; for accumulation an error of said first channel and
- a second summer coupled to said second channel for accumulation an error of said second channel.

15. An arrangement for acquiring an input signal as claimed in claim 9, wherein said phase error estimator further includes
- a limiter coupled to said first, second and third summers, said limiter for limiting said first and second phase error estimator output signals of said third summer.

16. An arrangement for acquiring an input signal as claimed in claim 9, wherein said phase error estimator includes:
- a first summer coupled to said first channel for accumulation an error of said first channel;
- a second summer coupled to said second channel for accumulation an error of said second channel;
- a first limiter coupled to said first channel and to said first summer, said first limiter for limiting said first phase error estimator output signal of said first channel; and
- a second limiter coupled to said second channel and to said second summer, said second limiter for limiting said second phase error estimator output signal of said second channel.

\* \* \* \* \*